UNITED STATES PATENT OFFICE.

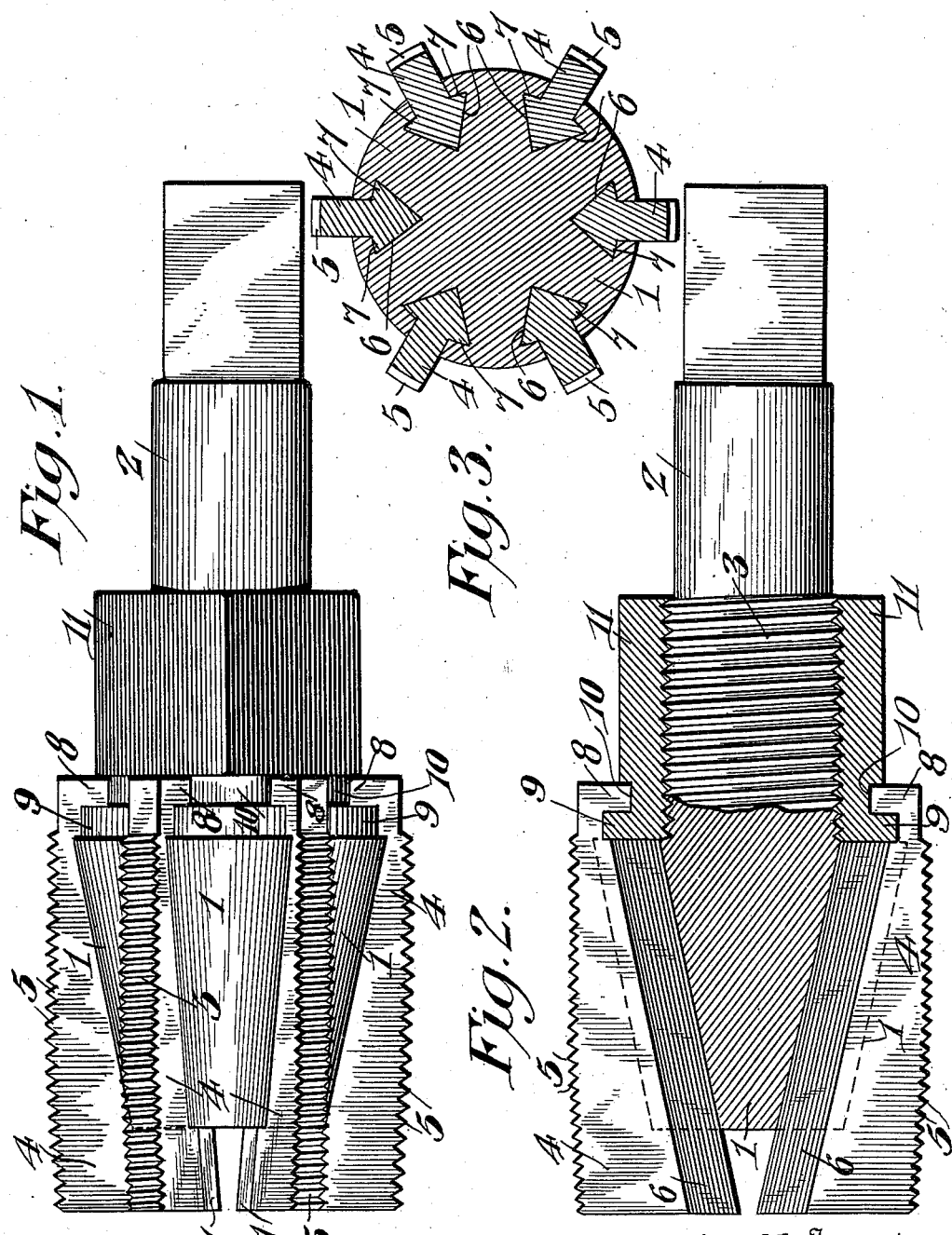

ADDISON B. CARLL, OF MOBILE, ALABAMA.

ADJUSTABLE TAP.

978,005.  Specification of Letters Patent.  Patented Dec. 6, 1910.

Application filed February 7, 1910. Serial No. 542,464.

*To all whom it may concern:*

Be it known that I, ADDISON B. CARLL, a citizen of the United States, residing at Mobile, in the county of Mobile and State of Alabama, have invented a new and useful Adjustable Tap, of which the following is a specification.

This invention relates to taps for forming interior threads on pipe fittings or flanges or similar articles, and has for its object the provision of a simple and strong construction whereby the tap may be made nearly straight, but so that it may be expanded, cutting the thread little by little until the full size is obtained without necessitating undue labor in turning the tap.

The stated object and such other objects as will hereinafter incidentally appear, are attained by the use of the device illustrated in the accompanying drawings, and the invention consists in certain novel features of the same which will be hereinafter first fully described and then specifically pointed out in the appended claim.

In the drawings, Figure 1 is an elevation of a tap embodying my improvements. Fig. 2 is a longitudinal section of the same. Fig. 3 is a transverse section through the head of the mandrel.

The mandrel comprises a head 1 and a shank 2, having a threaded portion 3, as shown. The head 1 is provided with a plurality of longitudinally-disposed grooves which are substantially V-shaped in cross section and communicate with longitudinal slots leading to the outer surface of the head, the bases of the grooves converging toward the outer end of the head. The cutters 4 are provided on their outer edges with the usual cutting teeth 5, and their inner edges are tapered or beveled as shown at 6, so as to fit within the V-shaped longitudinal grooves in the head and are expanded beyond the sides of the body of the cutter so as to provide shoulders 7 which engage against the outer walls of the longitudinal grooves in the head of the mandrel and, consequently, prevent the cutters slipping radially from their engagement with the mandrel. By employing this tapered or V-shaped construction of the cutters and the longitudinal grooves in the mandrel, I am enabled to employ a large number of cutters in a single mandrel and, consequently, accomplish the threading of the pipe fitting or nut more expeditiously than has been heretofore possible.

The inner ends of the cutters are provided with longitudinally-disposed overhanging hooks or lugs 8 which are adapted to engage over a flange 9 and in an annular groove 10 in a nut 11 which is mounted on the threaded portion 3 of the mandrel and is adapted to be moved longitudinally of the mandrel by reason of said threaded engagement, as will be readily understood. By rotating the collar or nut 11 so as to move it away from the head of the mandrel, the cutters will be caused to move longitudinally of the head and toward the wider end thereof so that they will be expanded or moved radially outward upon the said head and, consequently the cutting edges may be formed without much taper, but the die may be set in to start in the ring which is to be tapped and gradually expanded out, cutting the thread little by little until it is the required size without undue labor. This construction and arrangement of the parts effects a positive and rapid adjustment of the cutters and at the same time supports them firmly in operative position in all their adjustments. The exact engagement of the cutters with the adjusting nut illustrated and just described is preferred by me owing to the facility with which the parts may be assembled, but it will be understood, of course, that the arrangement may be reversed and the hooks on the cutters made to engage an internal groove in the nut without involving any departure from the invention.

By referring to Fig. 3 of the drawings, it will be noticed that the head of the mandrel is cut away to a comparatively slight extent so that a strong support is provided for the cutters, and that the tapered formation of the inner edges of the cutters permits the head to be constructed in very nearly an unmutilated form, so that while a large number of cutters may be supported in the head, the structure will not be weakened in any degree.

Having thus described the invention, what I claim as new, and desire to secure by Letters Patent, is:—

The combination of a mandrel having a head provided with a series of converging longitudinal V-shaped grooves, and a corresponding series of straight-walled radial longitudinal slots leading outward from the said grooves, the apex of the V-shaped grooves facing the center of the head and the said slots being narrower than the widest or outer part of said grooves, a series of cutters having tapered enlarged inner edges snugly fitting in the said V-shaped grooves, and longitudinal lateral shoulders bearing against the outer walls of the said grooves, the sides of the cutters beyond the said shoulders being straight and parallel to fit in the straight walled radial slots of the mandrel, and means for adjusting the cutters longitudinally of the grooves and slots.

In testimony, that I claim the foregoing as my own, I have hereto affixed my signature in the presence of two witnesses.

ADDISON B. CARLL.

Witnesses:
GLENN L. HAMBURGER,
D. S. VINCENT.